3,272,603
REFRACTORY METAL COMPOSITE
Earl I. Larsen, Indianapolis, Ind., assignor to P. R. Mallory & Co., Inc., Indianapolis, Ind., a corporation of Delaware
No Drawing. Filed Jan. 23, 1964, Ser. No. 339,586
6 Claims. (Cl. 29—191)

The present invention relates generally to composite materials and has specific pertinence to the use of copper-yttrium alloys to produce a copper-yttrium-refractory metal composite suitable for electrical contacts, resistance welding electrodes, and electrical discharge machining electrodes.

Composite materials comprising a refractory metal constituent, such as tungsten, and a high conductivity constituent, such as copper, have been used in the electrical and welding arts for many years and on a very substantial scale. The principal advantage of composites of this type is that they combine the substantial hardness and other desirable characteristics of the refractory metal with the superior thermal and electrical conductivity of the high conductivity metal.

Refractory metals and compounds suitable for use herein include tungsten, molybdenum, tungsten carbide, and molybdenum carbide. Since there is little or no solubility between copper and the aforementioned refractory constituents, composite materials obtained therefrom are usually fabricated by powder metallurgy techniques.

Composites of copper and refractory metal, as hereinbefore described, are used in industry in a wide variety of applications. Important applications are electrical contacts, resistance welding electrodes, and electrical discharge machining electrodes. In each of these embodiments, one characteristic of importance is the contact or surface resistance of the copper-refractory metal composite. The surface resistance is low on a freshly machined, sanded, or polished surface. However, the application of the composite in the device is such that the faces of the copper-refractory metal composites always become heated during operation. For example, the faces of electrical contacts are heated by arcing during the making and breaking of electrical circuits. The faces of resistance welding electrodes are heated by being in contact with the parts being welded. Electrical discharge electrodes are heated by the action of the sparking. All of the foregoing have a deleterious effect on the performance of the copper-refractory metal composite in that they cause the copper component to become oxidized.

It has been found that the oxidation resistance of copper can be substantially increased by means of a minor addition of yttrium thereto. For example, copper-yttrium alloys containing on the order of 0.1% yttrium are twice as resistant to oxidation as commercially pure copper at elevated temperatures, i.e., at approximately 600° C. Furthermore, the electrical conductivity of copper is not depressed by an addition of 0.1% yttrium.

In the present invention, it was discovered that the addition of a small quantity of yttrium to copper-refractory metal composites would produce markedly improved properties with respect to oxidation resistance. Such a result offers substantial advantages in the electrical contact and electrode applications hereinbefore cited.

It is an object of the present invention, therefore, to utilize the oxidation resistant properties of copper-yttrium alloys to produce a copper-yttrium-refractory metal composite having superior properties.

It is another object of the present invention to produce a copper-yttrium-refractory metal composite having substantially better resistance to oxidation than the copper-refractory metal composites currently known to the art.

Yet another object of the present invention is to provide a copper-yttrium-refractory metal composite which can be fabricated by conventional powder metallurgy techniques.

Still another object of the present invention is to provide a copper-yttrium-refractory metal composite wherein the electrical conductivity of copper is not depressed by the addition of yttrium in minimal quantities.

Yet another object of the present invention is to provide a copper-yttrium-refractory metal composite wherein the copper-yttrium-alloy, either in powder or solid form, may be prepared prior to incorporation into the refractory metal matrix.

Still another object of the present invention is to provide a copper-yttrium-refractory metal composite wherein the solid copper-yttrium alloy may be formed during an infiltration process.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects and advantages of the present invention will become apparent from the following description. The scope of the invention, however, is to be determined from the appended claims.

Generally speaking, in accordance with the principles of the present invention, there is provided a new and useful composite metallurgical material which has excellent electrical and mechanical properties, and is particularly characterized by a high resistance to oxidation at elevated temperatures. The novel composite material can be used for electrical contacts, for pressure-exerting welding electrodes, or in any application where the prime requisites are a low erosion rate and a high resistance to oxidation. These new results and advantages are obtained by a metal composition containing copper, a refractory metal, and yttrium, the latter being present within a well-defined and narrow range. Thus, it has been found that materials essentially composed of 20% to 90% by weight of the refractory metal, 0.1% to 1.0% yttrium, and the balance copper, consistently provide the advantages of the instant invention.

Various methods are known to the art for making compositions of copper and refractory metal, of which the press-sinter-infiltration method has been found to provide highly satisfactory results. This method essentially comprises the formation of a refractory metal compact which, after sintering, will contain interconnecting pores. These pores are then filled with copper by a process of infiltration or impregnation. The infiltration process is accomplished by placing solid copper in contact with the porous sintered refractory metal skeleton, and heating in a reducing atmosphere or vacuum at a temperature above the melting point of copper. The molten copper is thereupon absorbed by the porous sintered refractory metal skeleton by capillary attraction. The resultant composite, therefore, combines many of the characteristics of both the refractory metal and copper.

Another satisfactory method of preparing copper-tungsten or copper-molybdenum compositions comprises mixing copper powder and the refractory metal powder together, compacting the mix, and then sintering at temperatures either above or below the melting point of copper.

As hereinbefore mentioned, the present invention employs a small amount of yttrium in addition to the copper-refractory metal constituents. Either of the two aforementioned methods of preparation may be employed in the present invention. Instead, however, of using copper powder or solid copper, a copper-yttrium alloy powder and/or a solid copper-yttrium alloy is employed. The copper-yttrium alloy may be formed prior to incorporating it into the refractory metal matrix or it may be formed during the infiltration procedure.

Although the present invention has been disclosed in connection with preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

What is claimed is:

1. A metal composition having improved resistance to oxidation at elevated temperatures composed of 20% to 90% by weight of a refractory metal in the form of a porous matrix, the balance of the composition being a copper-yttrium alloy containing from about 0.1% to 1.0% by weight of yttrium, and the remainder copper, said pores of said refractory metal substantially filled with said copper-yttrium alloy.

2. A metal composition having improved resistance to oxidation at elevated temperatures composed of 20% to 90% by weight of tungsten in the form of a porous matrix, the balance of the composition being a copper-yttrium alloy containing from about 0.1% to 1.0% by weight of yttrium, and the remainder copper, said pores of said tungsten substantially filled with said copper-yttrium alloy.

3. A metal composition having improved resistance to oxidation at elevated temperatures composed of 20% to 90% by weight of molybdenum in the form of a porous matrix, the balance of the composition being a copper-yttrium alloy containing from about 0.1% to 1.0% by weight of yttrium, and the remainder copper, said pores of said molybdenum substantially filled with said copper-yttrium alloy.

4. A metal composition having improved resistance to oxidation at elevated temperatures composed of 20% to 90% by weight of a refractory metal carbide in the form of a porous matrix, the balance of the composition being a copper-yttrium alloy containing from about 0.1% to 1.0% by weight of yttrium, and the remainder copper, said pores of said refractory metal carbide substantially filled with said copper-yttrium alloy.

5. A metal composition having improved resistance to oxidation at elevated temperatures composed of 20% to 90% by weight of tungsten carbide in the form of a porous matrix, the balance of the composition being a copper-yttrium alloy containing from about 0.1% to 1.0% by weight of yttrium, and the remainder copper, said pores of said tungsten carbide substantially filled with said copper-yttrium alloy.

6. A metal composition having improved resistance to oxidation at elevated temperatures composed of 20% to 90% by weight of molybdenum carbide in the form of a porous matrix, the balance of the composition being a copper-yttrium alloy containing from about 0.1% to 1.0% by weight of yttrium, and the remainder copper, said pores of said molybdenum carbide substantially filled with said copper-yttrium alloy.

References Cited by the Examiner

UNITED STATES PATENTS

| | | | |
|---|---|---|---|
| 2,697,043 | 12/1954 | Wade | 75—153 |
| 2,879,159 | 3/1959 | Bolkcom et al. | 75—153 |
| 2,983,996 | 5/1961 | Neely et al. | 75—176 |
| 3,049,753 | 8/1962 | Ogden et al. | 75—176 |

References Cited by the Applicant

UNITED STATES PATENTS

| | | |
|---|---|---|
| 2,144,249 | 1/1939 | Allen. |
| 2,187,630 | 1/1940 | Schaefer. |
| 2,825,703 | 3/1958 | Conant. |

OTHER REFERENCES

"Machine Design," vol. 35, No. 30, dated December 19, 1963, at page 28, 3rd para.

DAVID L. RECK, *Primary Examiner.*

HYLAND BIZOT, *Examiner.*

R. O. DEAN, *Assistant Examiner.*